United States Patent [19]

Pritchard

[11] Patent Number: 5,706,414
[45] Date of Patent: Jan. 6, 1998

[54] DOT DEPLETION IN PIXEL-ARRAY PRINTING

[75] Inventor: Thomas B. Pritchard, Brush Prairie, Wash.

[73] Assignee: Hewlett-Packard Company, Palo Alto, Calif.

[21] Appl. No.: 728,419

[22] Filed: Oct. 10, 1996

Related U.S. Application Data

[63] Continuation of Ser. No. 138,678, Oct. 18, 1993, abandoned.

[51] Int. Cl.[6] ................................................ H04N 1/40
[52] U.S. Cl. ........................................ 395/117; 395/101
[58] Field of Search ................................ 395/117, 101, 395/112, 111, 110, 109, 329

[56] References Cited

U.S. PATENT DOCUMENTS

| | | | |
|---|---|---|---|
| 5,216,451 | 6/1993 | Rawson et al. | 346/140 |
| 5,321,796 | 6/1994 | Komaki | 395/110 |
| 5,329,616 | 7/1994 | Silverbrook | 395/164 |
| 5,345,517 | 9/1994 | Katayama et al. | 382/54 |
| 5,347,266 | 9/1994 | Bruman et al. | 340/735 |
| 5,353,387 | 10/1994 | Petschik et al. | 395/109 |
| 5,371,838 | 12/1994 | Fujii et al. | 395/116 |
| 5,422,664 | 6/1995 | Stephany | 347/14 |
| 5,426,010 | 6/1995 | Morton | 430/22 |

FOREIGN PATENT DOCUMENTS

| | | |
|---|---|---|
| 0513989 | 11/1992 | European Pat. Off. |
| 0625765 | 11/1994 | European Pat. Off. |
| 61-15460 | 1/1986 | Japan |
| 63-247039 | 10/1988 | Japan |
| 9101888 | 2/1991 | WIPO |

Primary Examiner—Raymond J. Bayerl
Assistant Examiner—Steven P. Sax

[57] ABSTRACT

A method for reducing the volume of ink applied to high-density print regions by depleting certain pixels in these regions avoids problems associated with excessive ink, improves economy, and yet retains print quality. Pixels located along the edges of high-density regions are identified and not depleted, thus preserving the sharp image demarcations characteristic of high quality printing. An upper bound for the percentage of depleted pixels may be chosen. A two-dimensional depletion table having certain entries designated as potential depletion candidates is tiled across a pixel image to be depleted. The designated entries are spaced apart within the table. If a pixel in the image is a candidate to be depleted according to the depletion table and if it is not an edge pixel, then it is depleted.

12 Claims, 4 Drawing Sheets

COLUMN

|   | 0 | 1 | 2 | 3 | 4 | 5 | 6 |
|---|---|---|---|---|---|---|---|
| 0 | 0 | 0 | 0 | 0 | 1 | 0 | 0 |
| 1 | 0 | 1 | 0 | 0 | 0 | 0 | 0 |
| 2 | 0 | 0 | 0 | 0 | 0 | 0 | 1 |
| 3 | 0 | 0 | 0 | 0 | 0 | 0 | 0 |
| 4 | 0 | 0 | 1 | 0 | 0 | 0 | 0 |
| 5 | 0 | 0 | 0 | 0 | 0 | 1 | 0 |
| 6 | 0 | 0 | 0 | 0 | 0 | 0 | 0 |

ROW

FIG. 2

COLUMN

|   | 0 | 1 | 2 | 3 | 4 | 5 | 6 |
|---|---|---|---|---|---|---|---|
| 0 | 1 | 0 | 0 | 0 | 1 | 0 | 0 |
| 1 | 0 | 0 | 1 | 0 | 0 | 0 | 0 |
| 2 | 0 | 0 | 0 | 0 | 1 | 0 | 0 |
| 3 | 0 | 1 | 0 | 0 | 0 | 0 | 1 |
| 4 | 0 | 0 | 0 | 1 | 0 | 0 | 0 |
| 5 | 1 | 0 | 0 | 0 | 0 | 1 | 0 |
| 6 | 0 | 0 | 1 | 0 | 0 | 0 | 0 |

ROW

FIG. 3

```
              COLUMN
         0 1 2 3 4 5 6
       ---------------
       0 0 1 0 0 0 0 1
       1 0 0 1 0 1 0 0
       2 0 1 0 0 0 0 1
ROW    3 0 0 0 1 0 1 0
       4 1 0 1 0 0 0 0
       5 0 0 0 1 0 1 0
       6 1 0 1 0 1 0 0
```

FIG. 4

```
              COLUMN
         0 1 2 3 4 5 6
       ---------------
       0 1 0 1 1 0 1 0
       1 0 1 0 0 1 0 1
       2 0 1 0 0 1 0 1
ROW    3 1 0 1 1 0 1 0
       4 0 1 0 0 1 0 1
       5 1 0 1 1 0 1 0
       6 0 1 0 0 1 0 1
```

FIG. 5

```
            RELATIVE
            COLUMN
           | -1   0   +1
        ---+------------
         -1|      1
RELATIVE   |
   0       | 1   X   1
  ROW      |
         +1|      1
```

FIG. 6

```
              RELATIVE
              COLUMN
           | -1   0   +1   +2
        ---+------------------
         -1|      1    1
RELATIVE   |
   0       | 1   X    0    1
  ROW      |
         +1|      1    1
```

FIG. 7

DOT DEPLETION IN PIXEL-ARRAY PRINTING

This is a continuation of application Ser. No. 08/138,678 filed on Oct. 18, 1993, now abandoned.

BACKGROUND OF THE INVENTION

1. Field of the Invention

The present invention relates to the field of pixel-array printing. More specifically, the present invention pertains to a method for depleting dots in high-density print regions in the ink-jet implementation of pixel-array printing.

2. Description of Related Art

The term pixel-array refers to a (usually large) two-dimensional array of uniformly spaced and sized cells called pixels (picture elements). By "turning on" certain pixels with ink, light, etc., an image of text and pictures may be formed on the array. The intrinsic binary nature of this image becomes less obvious and the perceived image quality improves as the number of pixels per unit area increases.

In pixel-array printing, certain areas on the print media may receive a relatively large amount of ink because of the density of the printed image in those areas. In ink-jet technology, a form of pixel-array printing, drops of ink are expelled from one or more nozzles in a printhead onto a print surface such as paper. Usually one drop produces a single pixel or dot. Sometimes the amount of ink is excessive due to expelling larger ink drops than desired from the printhead. This may be caused by manufacturing tolerances, high temperatures, or other reasons. When this happens, these dense areas can cause problems in the quality of printing and the handling of the media.

In areas of high density, the ink may not dry quickly enough. As a result, the still-wet ink may blot onto the preceding or following page in the output tray. The following page may rub against the wet ink and smear the image. When the user picks up the page, the ink may smear on the user's hands or clothes, also smearing the image.

Also, in areas of high density, ink may be wasted, as the enlarged drops overlap each other. An equally dense image may be achieved with less ink, and with less drying problems.

Furthermore, too much ink can cause paper print media to buckle, or "cockle." If the printhead-to-paper spacing is relatively small, the paper may rub against the printhead and smear the ink.

Finally, ink in high-density areas may wick to lower-density areas, degrading the image quality.

Numerous solutions have been tried to solve these problems. Inks which dry more quickly avoid many of the above-mentioned problems. Unfortunately, if the ink dries quickly on the page, it may dry too quickly in the printhead, thereby clogging the nozzles.

Inks may be formulated to be absorbed quickly into the paper. However, these inks also tend to wick along the surface fibers as well, thus degrading edges in the image.

A printhead which ejects less ink—that is, a lower "drop volume" printhead—may also be used. However, printheads which have a lower drop volume tend to magnify the variations caused by manufacturing or operating tolerances. These tolerances can be decreased to minimize the artifacts, but this causes additional expense in materials and manufacturing.

A heater could be used to control the environment around the printing process to ensure that the ink dries quickly enough. However, the heater and supporting hardware would add to the cost of the printer.

To prevent the pages from smearing in the output tray, the printer could detect when high densities of ink have been printed on a page, and pause to allow the ink to dry before ejecting the page to the output tray. Such pauses would decrease the throughput of the printer.

Another attempted solution is to deplete some of the pixels: that is, not to print certain pixels which otherwise would be printed. A repeating 8×8 depletion mask may be used which arbitrarily depletes those pixels blocked by the mask. The arbitrariness of the depletion tends to degrade images and edges of text. Furthermore, the 8×8 size is likely to cause artifacts when applied to halftoned data. These artifacts occur because the halftoning is achieved through application of a "dither cell" whose dimensions are typically 8×8 or other numbers having a common factor with 8. Interaction between the dither cell and the depletion mask can cause periodic artifacts which are highly visible in the printed image.

To avoid the problems of the 8×8 repeating mask, pixels may be randomly depleted over the image until the desired amount of depletion has occurred. But this method also tends to degrade images and edges of text. It also allows pixels adjacent to each other to be depleted, causing visible spaces between pixels.

What is needed is a method for depleting the applied ink in high-density print regions which does not degrade print quality significantly and does not require expensive modifications to a printer.

SUMMARY OF THE INVENTION

The present invention allows high-density print regions to be depleted without significantly degrading print quality. Applying the methodology of the invention to a printer requires only inexpensive modifications.

The invention includes a method which operates on images comprised of pixels. As an initializing step, a depletion table is generated. The depletion table marks those pixels which are candidates for depletion.

To determine whether to deplete a pixel, a two-step process is used. First, the depletion table is checked to determine if the pixel is a candidate for depletion. Second, the adjacent pixels are checked to determine if the candidate is an edge pixel. If the pixel is a candidate for depletion and is not an edge pixel, it is depleted.

Pixels which define an edge of the printed image are not depleted, even when they are candidates for depletion. This preserves the sharpness and attendant quality of the image. This is especially important for alphanumeric text. Also, in areas of low density, such as found in halftone graphics, this approach maintains greyscales and image gradations.

It is preferable for the depletion table to have dimensions which have no common factors with the dimensions of an ordered-dither cell used in halftoning the image data. Dimensions of 7×7 are preferable for the depletion table.

A particular pixel is a candidate for depletion if the depletion table, when mapped onto the image data, has a corresponding entry marking the pixel as such. The set of depletion tables mapped over the entire image may be called a "depletion plane." A preferred method of generating a depletion plane uses the modulo function to "tile" the depletion table—that is, to repeat it periodically in both dimensions—across the image data. The modulo function uses the position of the pixel in the image and the dimensions of the depletion table.

In one aspect of the invention, a particular pixel is determined not to be an edge pixel if the four pixels adjacent to it are "on" (that is, are to be printed). As a preferred enhancement, if only one of the adjacent pixels is "off", then as long as that one "off" pixel is surrounded by "on" pixels, the particular pixel is determined to not be an edge pixel.

These and other features, aspects, and advantages of the present invention will become better understood by referring to the following description and appended claims.

BRIEF DESCRIPTION OF THE DRAWINGS

FIG. 2 shows a 7×7 depletion table, for use in the method of FIG. 1, having 10 percent depletion.

FIG. 3 shows a 7×7 depletion table, for use in the method of FIG. 1, having 20 percent depletion.

FIG. 4 shows a 7×7 depletion table, for use in the method of FIG. 1, having 31 percent depletion.

FIG. 5 shows a 7×7 depletion table, for use in the method of FIG. 1, having 49 percent depletion.

FIG. 6 shows a prospective pixel to be depleted in relation to four adjacent pixels.

FIG. 7 shows a prospective pixel to be depleted in relation to four adjacent pixels and three additional pixels.

DETAILED DESCRIPTION OF THE INVENTION

Figure 1:
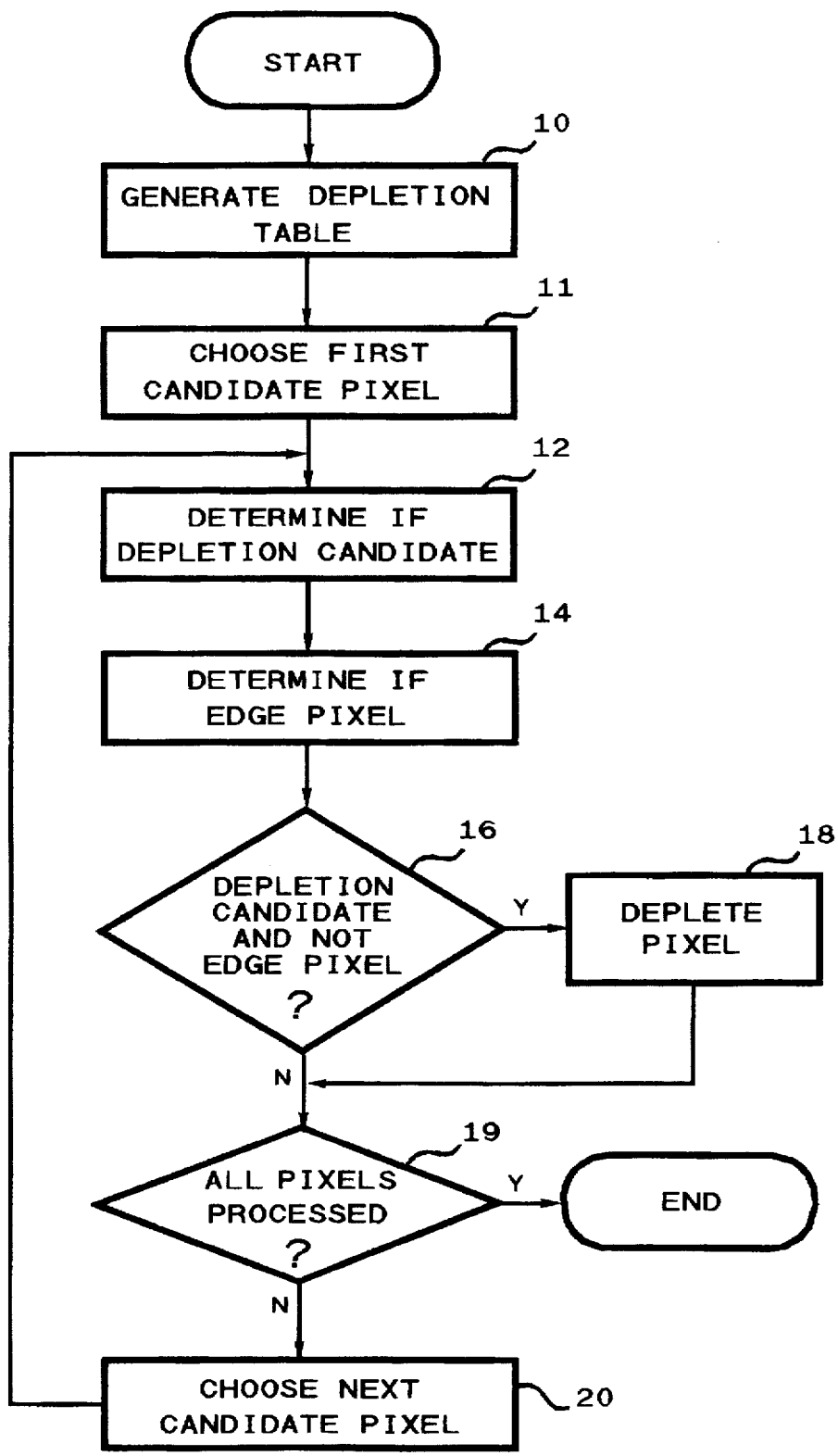
FIG. 1 shows an overall flow diagram of a depletion method according to the present invention

The present invention provides a method for depleting which may be used on the entire image. It will not deplete those areas which should not be depleted, in particular sharp edges of the image, such as those of alphanumeric text.

Referring now to FIG. 1, as an initial step, a depletion table is generated (10). The depletion table is a rectangular array of binary flags which can be mapped onto all pixels of the undepleted image. A "TRUE" flag designates that the corresponding pixel is a potential candidate for depletion.

The percentage of "TRUE" flags in the depletion table can be increased or decreased, depending on the characteristics of the printer and the desired output results. For example, an otherwise too-large percentage may be chosen to conserve ink and provide an economy print mode. The percentage of "TRUE" flags is an upper bound on the percentage of pixels ultimately depleted since, as will be explained shortly, some candidates for depletion will be spared when it is determined that they are also "edge" pixels.

To minimize the occurrence of objectionable printing artifacts, the "TRUE" flags should be arranged to be spaced apart. When arranging the "TRUE" flags, the spacing should take into consideration that the table will be tiled across the undepleted image. Thus, the left and right edges of the table are effectively adjacent, as are the top and bottom edges.

The undepleted data upon which the method of the present invention operates may be text, line art, or half-toned images. Digital half-toned images are commonly generated using a two-dimensional ordered-dither cell. If the dimensions of the depletion table have common factors with those of the ordered-dither cell, then the resulting image can be noticeably degraded. Thus, the height and width of the depletion table preferably have no common factors with the height and width, respectively, of any ordered-dither cell which has been used to generate the undepleted data.

A depletion table which is 7×7 works well. Although there is no standard size for an ordered dither cell, currently observed sizes are 8×8, 16×16, 6×6, 10×10, and 12×12. Ordered dither cells are unlikely to be 7×7 or 14×14 because these are close in size to 8×8 and 16×16, which dimensions, since they match the size of one byte or two bytes, are easier and faster to work with for most halftoning implementations.

There is no requirement that the depletion table's width and height be equal.

FIGS. 2 through 5 show exemplary 7×7 depletion tables. The depletion table of FIG. 2 has five "TRUE" flags (designated by the number "1") resulting in a potential depletion of 5/49 or approximately ten percent. The depletion tables of FIGS. 3, 4, and 5 have 10, 15, and 24 "TRUE" flags respectively, resulting in potential depletions of approximately 20 percent, 31 percent, and 49 percent.

Those skilled in the art will recognize that other depletion tables having the same or different percentages of potential depletion as those shown in FIGS. 2 through 5 also could be generated.

Referring again to FIG. 1, once the table is generated, the following steps may be applied to every pixel to be printed.

First, a pixel is chosen for examination (step 11). The depletion table is then used to determine whether this pixel is a candidate for depletion (step 12).

The undepleted image may be represented as a two-dimensional array Image[row,column]. The pixel at the upper-left corner of the image is represented as Image[0,0] with columns increasing to the right and rows increasing to the bottom of the image. Similarly, the depletion table may be described as an array Table[row,column] whose dimensions match the size of the table.

An "on" pixel in the image at location [R,C] is a candidate for depletion if the depletion table at Table[table_row, table_col] is marked "TRUE" where:

$$table\_row = R \bmod (table\_height) \quad (1)$$

$$table\_col = C \bmod (table\_width) \quad (2)$$

where table_height and table_width are the height and width of the depletion table, respectively. The modulo function tiles the depletion table on the image.

Next, an edge test is applied: the current pixel's adjacent "neighbors" are examined to determine if the pixel is an edge pixel (step 14). Referring now to FIG. 6, a pixel denoted by "X" at the relative location (0,0) has four immediately adjacent pixels: Image(−1,0), Image(0,+1), Image(+1,0), and Image(0,−1). (The parentheses in the foregoing expressions denote relative locations; brackets are used for absolute locations.) A pixel is not an edge pixel if each of these four adjacent pixels is on.

An alternative edge test which requires more processing but which typically gives somewhat better print quality is to follow the above rule, but also to allow depletion if a single neighboring pixel is off, provided that the neighbor is surrounded by pixels which are on (including, of course, the test pixel X). Which of the four neighbors (say, north, south, east, or west) is off is unimportant, as long as only one neighbor is off. Allowing multiple off pixels causes degraded print quality. However, for a given image, it is important that the choice of neighbor to be examined for this test be consistent. For instance, if the north neighbor is chosen for this alternative test, then only north neighbors of pixels should be examined.

The alternative edge test can be carried out as follows. First, the pixel being examined is subjected to the test of FIG. 6. If it is thereby determined to be a depletion candidate, the test is over and the next pixel is examined. However, if it is rejected as a candidate by the test of FIG. 6, then the test illustrated in FIG. 7 is applied. First, it must be determined that only one of the four neighbors is off, and that it is (in this illustration) the east neighbor. This is shown in FIG. 7 as Image(0,+1), or the pixel to the right of Image(0,0), the test pixel X. The three neighbors of Image (0,+1) are then examined: Image(−1,+1), Image(0,+2), and Image(+1,+1). If they are on, pixel X thereby becomes a depletion candidate. In FIG. 7, the three neighbors of Image(0,+1) are on, and so pixel X is a depletion candidate.

Continuing with the process of FIG. 1, if the current pixel is a depletion candidate and not an edge pixel (block 16), then the pixel is depleted in block 18. That is, no ink dot is applied at that pixel location. Having finished processing the current pixel, a check is made to see whether all pixels have been processed (step 19). If not, a new pixel is chosen for examination (step 20) and the method is repeated until all pixels are processed.

Large-Scale Implementation

For clarity of understanding, the above description of an aspect of the invention necessarily concerns one-at-a-time operations on individual pixels. If the image is large and the implementing apparatus slow, the process could be time consuming if individual pixels are processed serially.

If a microprocessor, an array processor, or some special-purpose hardware is available, then more than one pixel at a time may be processed through a large-scale or "batch" processing mode of the invention. The following explanation pertains to batcht processing the input image plane, using the first edge-detecting method (illustrated in FIG. 6).

First, a modified image plane composed of non-edge pixels is generated: The input plane is shifted by one pixel in each of four directions (left, right, up, down), thereby generating four shifted planes. The logical AND of these four planes is an image plane with only non-edge pixels retained.

Second, a depletion plane is generated by tiling the depletion table both horizontally and vertically a sufficient number of times to cover all pixel locations in the image plane. (Tiles which extend beyond the edges of the image plane may be truncated).

Next, a pixel-depletion locator plane is formed by generating the logical AND of the non-edge pixel plane and the depletion plane.

Finally, to perform the actual pixel depletion, the pixel-depletion locator plane is logically inverted and then logically ANDed with the input image plane. The resultant is an image plane with appropriate pixels depleted in accordance with the teachings of this invention.

In implementing the batch processing with, for instance, a microprocessor, the several planes can be treated as two-dimensional arrays and processed n bits at a time, where n is the bit width of the microprocessor, typically 8, 16, or 32.

The modified image plane may be formed by ANDing four n-bit words, the data of each obtained by shifting the corresponding image data in one of the four directions. The result becomes the first n-bit word of the modified plane. The process is repeated until all the data of the modified plane is generated.

Because the depletion plane contains the repeated data of the depletion table, it is highly redundant. Therefore, it would be wasteful of memory to store the whole plane, only to retrieve and process n bits at a time. There are more efficient ways of producing the same result.

Assume, for instance, that an 8-bit microprocessor is used (n=8) along with a 7×7 depletion table. As the processor steps along a row of image data, retrieving successive bytes (8 bits) for processing, it also requires a succession of bytes of depletion plane data: 01234560, 12345601, 23456012, 34560123, 45601234, 56012345, 60123456 (sequence then repeats). Here, the numbers refer to the columns of the depletion table used to generate the depletion plane. These data bytes can be generated by the modulo function explained earlier. The modulo function is not an elementary logical operation, however, and implementing it can be time consuming. It requires much less processing time if the seven permutations of each of the seven rows can be determined in advance. These values may then be stored in a 49-byte lookup table, and retrieved in sequence as they are needed.

Other processing methods will be readily apparent to those skilled in the processing arts. Special purpose hardware, dedicated to the specific job, is an efficient option, especially for very large images with millions of pixels.

I have described and illustrated the principles of my invention with reference to a preferred method of practice; however, it will be apparent that the invention can be modified in arrangement and detail without departing from such principles. It will be recognized that the detailed method is illustrative only, and should not be taken as limiting the scope of my invention. Rather, I claim as my invention all such variations as may fall within the scope and spirit of the following claims and equivalents thereto.

I claim:

1. A method for depleting pixels in a pixel image plane, comprising the steps of:
    a) creating a depletion plane having locations mapped to all locations in the pixel image plane, wherein some depletion plane locations identify corresponding pixels as candidates for depletion;
    b) choosing a pixel in the image plane for examination;
    c) examining whether the chosen pixel is a candidate for depletion, by referring to its mapped location in the depletion plane;
    d) determining whether the chosen pixel is an edge pixel;
    e) depleting the chosen pixel if it is a candidate for depletion and if it is not an edge pixel; and
    f) choosing a different pixel and returning to step (c).

2. The pixel-depleting method of claim 1, wherein the step of creating the depletion plane comprises tiling a two-dimensional depletion table having some entries identifying candidates for pixel depletion.

3. The pixel-depleting method of claim 2, wherein the tiling method includes the use of a modulo function to operate on the coordinates of a location in the depletion plane and on the dimensions of the depletion table.

4. The pixel-depleting method of claim 3, wherein the results of the modulo function operation are pre-stored in a lookup table, from which they are retrieved as needed.

5. The pixel-depleting method of claim 2, wherein the dimensions of the depletion table have no common factor with the dimensions of an ordered-dither cell.

6. The pixel-depleting method of claim 1, wherein the image plane and the depletion plane are each represented by a 2-dimensional, binary-valued array, and the examining, determining, and depleting steps include logical operations on corresponding entries in these arrays.

7. The pixel-depleting method of claim 1, wherein the determining step comprises ascertaining whether the four pixels adjacent to the chosen pixel are on, and in response to a positive answer to the ascertaining step, concluding that the chosen pixel is not an edge pixel.

8. The pixel-depleting method of claim 7, wherein in response to a negative answer to the ascertaining step, the determining step further includes checking whether only a predetermined one of the four adjacent pixels is off and whether that predetermined one is, itself, surrounded by adjacent pixels which are on, and, in response to a positive answer to the checking step, concluding that the chosen pixel is not an edge pixel.

9. A method for depleting pixels in a pixel image plane, comprising the steps of:
   a) creating a depletion plane having locations mapped to all locations in the pixel image plane, wherein some depletion plane locations identify corresponding pixels as candidates for depletion;
   b) choosing a pixel in the image plane for examination;
   c) examining whether the chosen pixel is a candidate for depletion, by referring to its mapped location in the depletion plane;
   d) if the chosen pixel is not a depletion candidate, proceeding directly to step (g);
   e) determining whether the chosen pixel is an edge pixel;
   f) depleting the chosen pixel if it is not an edge pixel; and
   g) choosing a different pixel and returning to step (c).

10. In an image composed of pixels arranged as binary elements in an input plane, a method for depleting pixels, comprising the steps of:
   a) shifting the input plane the distance of one pixel in each of four planar directions, thereby producing four shifted planes;
   b) generating a non-edge-pixel plane as the logical AND of the four shifted planes;
   c) creating a depletion plane having locations mapped to pixels in the image plane, wherein some locations are designated as candidates for pixel depletion;
   d) producing a pixel-depletion locator plane as the logical AND of the depletion plane and the non-edge-pixel plane;
   e) logically inverting the pixel-depletion locator plane; and
   f) combining, by a logical AND, the inverted pixel-depletion locator plane with the input plane to produce a depleted-pixel image plane.

11. The pixel-depleting method of claim 10, wherein the step of creating a depletion plane includes generating a depletion table of dimensions smaller than the dimensions of the input plane, and tiling the depletion table to create the depletion plane.

12. The method of claim 11, wherein the generating step includes choosing the dimensions of the depletion table to have no common factor with the dimensions of an ordered-dither cell.

* * * * *

UNITED STATES PATENT AND TRADEMARK OFFICE
CERTIFICATE OF CORRECTION

PATENT NO. : 5,706,414
DATED : January 6, 1998
INVENTOR(S) : Thomas B. Pritchard It is certified that error appears in the above-identified patent and that said Letters Patent is hereby corrected as shown below:

On the title page, item [54]  In the Abstract

Line 1, delete "A method for".

Line 2, after "regions" insert --,--.

Line 2, delete "certain" and insert therefor --a percentage of--.

Line 3, after "regions" insert --,--.

Line 7, after "printing." delete "An upper bound for the percentage of depleted pixels may be chosen."

Line 9, delete "certain" and insert therefor --a chosen percentage of--.

Line 13, after "depleted" delete "according to the depletion table".

Line 14, after "depleted." insert therefor --The disclosure includes methods both for pixel-by-pixel processing and also for batch processing in a form adapted to microprocessor operation.--.

UNITED STATES PATENT AND TRADEMARK OFFICE
CERTIFICATE OF CORRECTION

PATENT NO. : 5,706,414
DATED : January 6, 1998
INVENTOR(S) : Thomas B. Pritchard It is certified that error appears in the above-identified patent and that said Letters Patent is hereby corrected as shown below:

Column 5, (line 33), delete "batcht" and insert therefor --batch--.

Signed and Sealed this

Sixteenth Day of March, 1999

Attest:

Q. TODD DICKINSON

Attesting Officer

Acting Commissioner of Patents and Trademarks